July 12, 1955

K. P. RYAN 2,712,723

MECHANICAL RAKE TOOTH MOUNTING

Filed Sept. 25, 1950

Kelly P. Ryan
INVENTOR.

BY
Attorneys

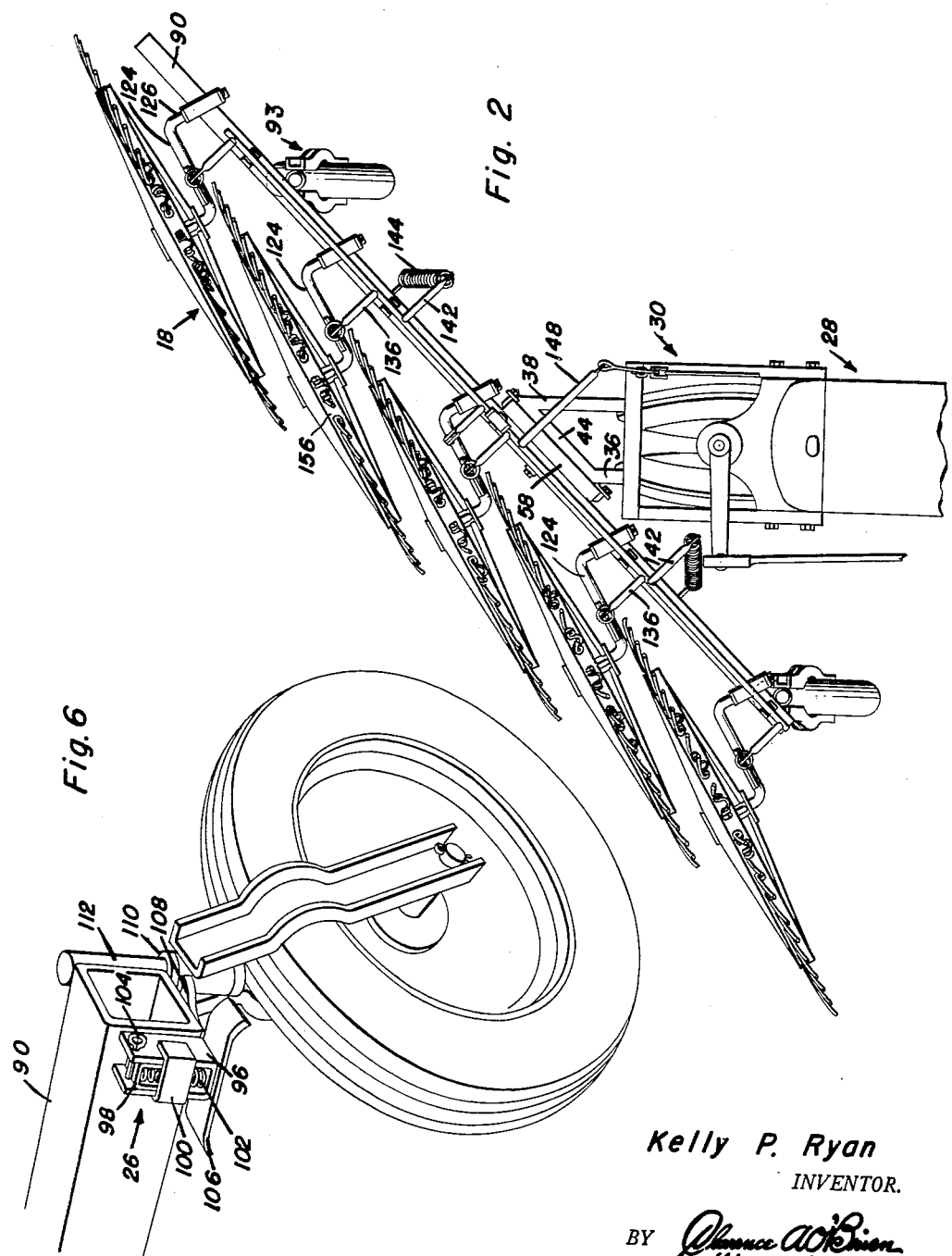

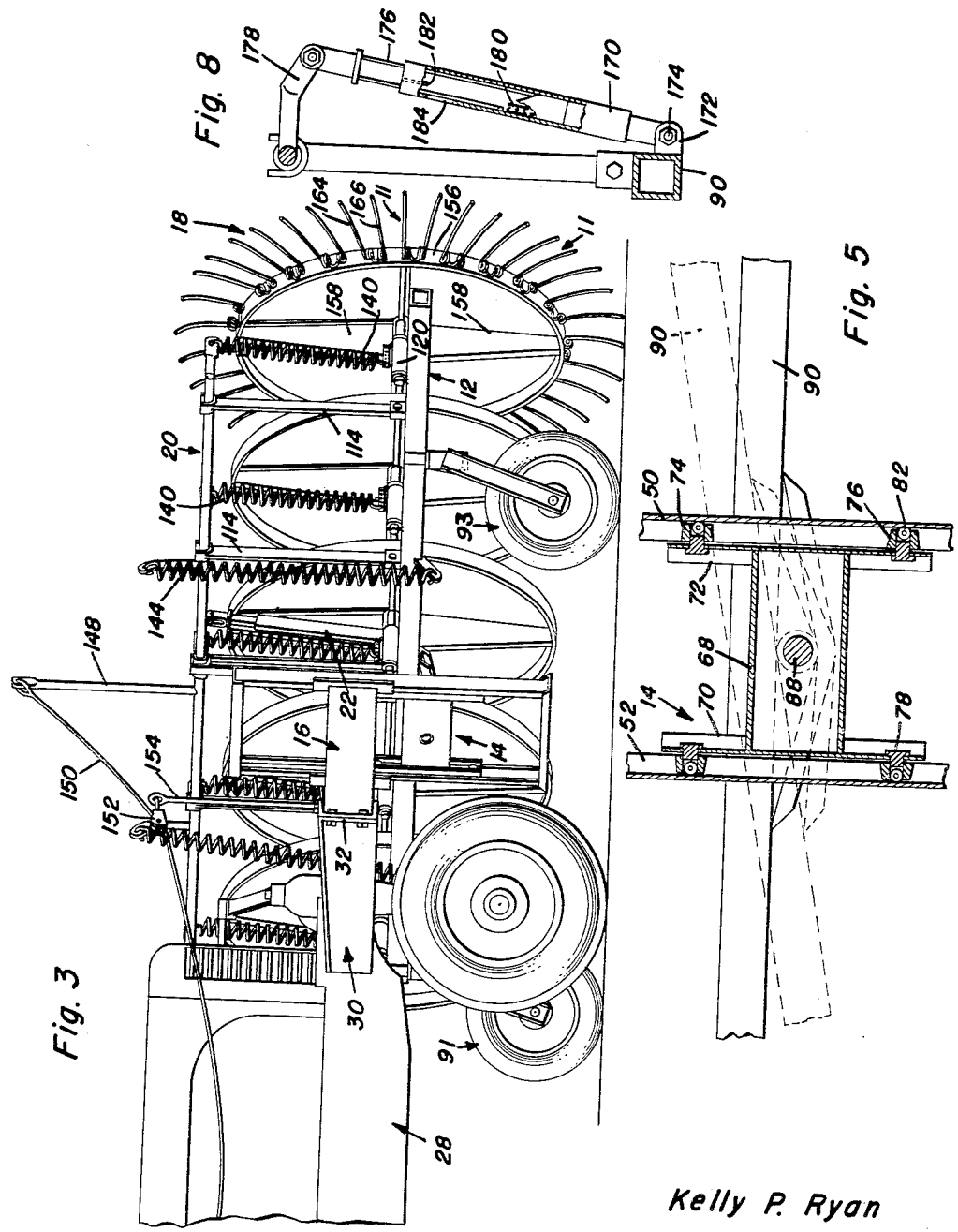

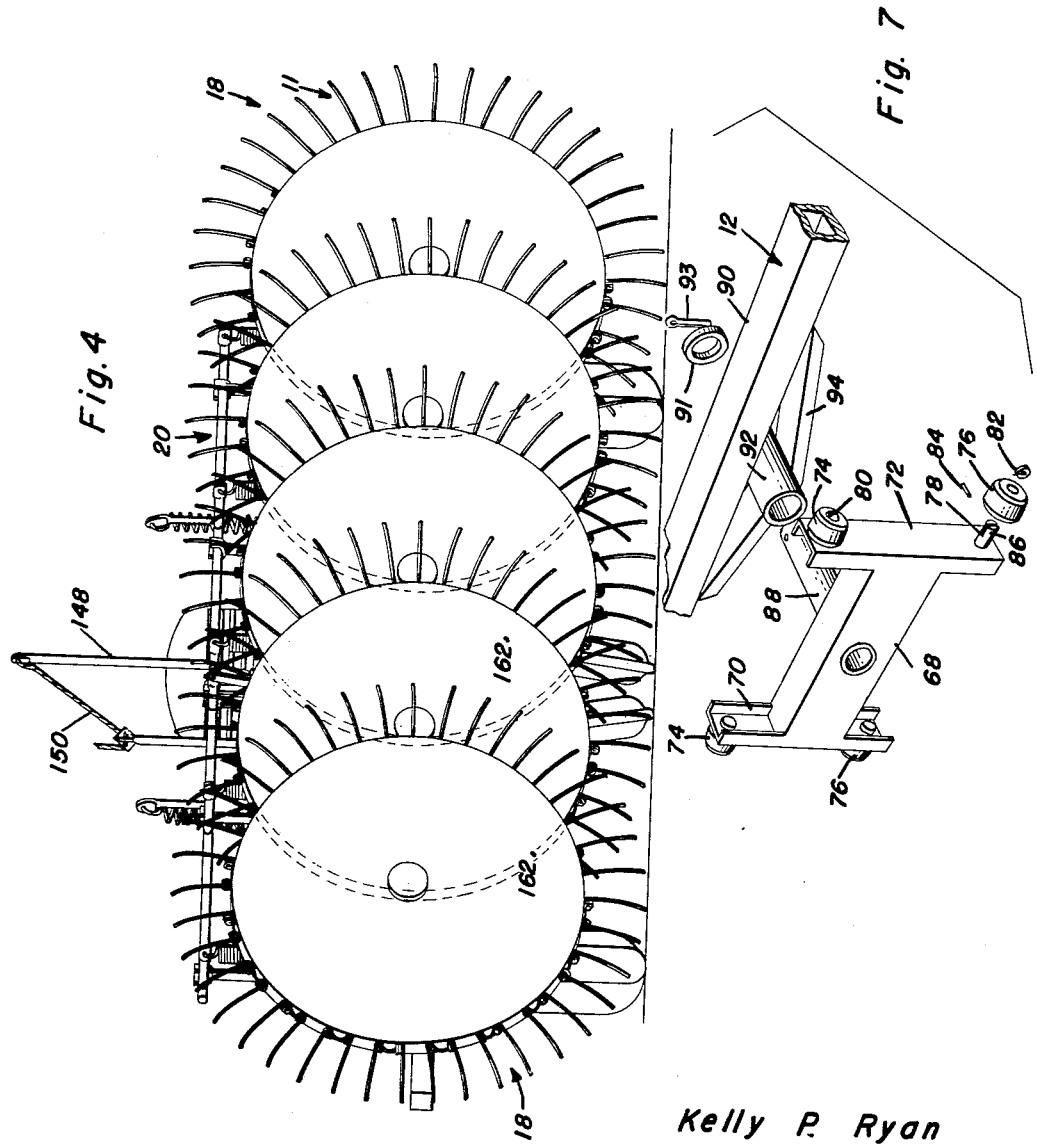

United States Patent Office 2,712,723
Patented July 12, 1955

2,712,723

MECHANICAL RAKE TOOTH MOUNTING

Kelly P. Ryan, Blair, Nebr., assignor to Kelly Ryan Equipment Company, Blair, Nebr.

Application September 25, 1950, Serial No. 186,658

6 Claims. (Cl. 56—400)

The present invention relates to improvements in attachments for tractors or the like and more particularly to a mechanical rake which is adapted to be positioned on the front end of a tractor and which comprises a plurality of disk-like raking means which are rotatable in response to forward movement of the tractor and upon contact between the outer periphery of the rake disk means and the ground.

An object of the present invention is to provide a novel mechanical rake wherein a plurality of raking disks are provided which are all resiliently supported whereby the rake disks as a group adjust themselves to the uneven surfaces of the field being raked.

Another object of the present invention is to provide a novel arrangement whereby the plurality of raking disks are simultaneously controlled for lifting and lowering and wherein means are provided for actuating the control means.

A further object of the present invention resides in the provision of a novel latching means whereby the raking disks will be releasably retained in their uppermost position which may be considered their inoperative position since the raking disks will then be out of contact with the ground.

Still another object of the present invention resides in the novel arrangement whereby the individual raking disks are resiliently supported on the supporting frame.

Still another object of the present invention resides in the relation between the means for attaching the mechanical rake to the front end of a tractor and the mechanical rake itself, whereby the individual raking disks are disposed in angular relation to the direction of travel.

Another object of the present invention is to provide the individual raking disks with sheet metal closures for the open faces of the disk rings whereby the hay being raked will not pass through the disks but will fall to the ground in front of the disks to be raked and rolled to the sides of the mechanical rake.

Another novel feature of the present invention resides in the rake teeth and the manner in which they are resiliently and removably attached to the outer periphery of the rake disks.

Various other objects and advantages will become apparent from the detailed description to follow. The best form in which I have contemplated applying my invention is clearly illustrated in the accompanying drawings, wherein:

Figure 2 is a top plan view of the mechanical rake of the present invention;

Figure 3 is a side elevational view of Figure 1;

Figure 4 is a front elevational view of the mechanical rake with the closure disks for the raking disks being included;

Figure 5 is a detail sectional view of the roller means disposed between the supporting means and the rectangular frame of the attaching means;

Figure 6 is a detail perspective view of one of the caster wheels employed for supporting the mechanical rake with the friction brake means employed to reduce the shimmy of the caster wheel;

Figure 7 is a detail perspective view of the means of Figure 5; and

Figure 8 is a side elevational view of the latching means employed in connection with the mechanical rake of the present invention, with parts in section.

Figure 1:
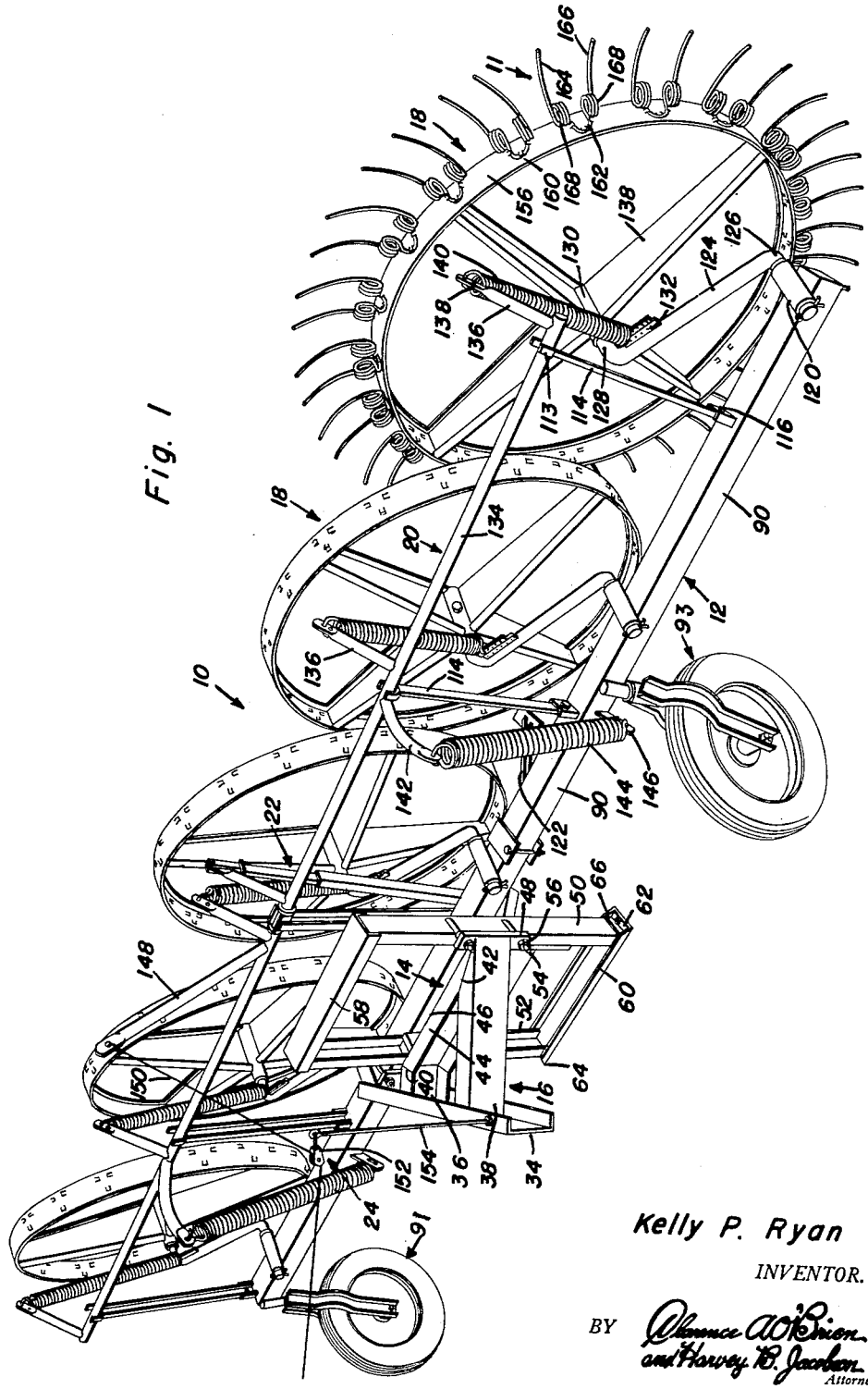
Figure 1 is a perspective view of the entire mechanical rake attachment with the teeth being shown on one of the rake disks and with the closure disks for the open sides of the rake disks being omitted to show the interior thereof.

Referring more particularly to the drawings, wherein like numerals designate like parts throughout, the numeral 10 designates generally the mechanical rake attachment of the present invention which is comprised of a mounting means 12, a centrally disposed attaching means 14, and a supporting means for the mechanical rake which is adapted to be attached to the tractor and designated generally by the numeral 16, a plurality of raking disk means 18, resiliently, rotatably and pivotally mounted with respect to the mounting frame 12, a control bar means 20, latching means 22 and mechanical lifting means for the rake disks designated generally by the numeral 24. Also employed in conjunction with the structure of the present invention is the novel friction brake designated generally by the numeral 26 and shown in Figure 6.

As seen best in Figure 3, the conventional tractor 28 is formed with a framework 30 at its front end which has its forwardmost portion formed with a transversely extending member 32 to which the supporting means 16 of the mechanical rake is to be attached. Since the construction of the frame 30 is well within the realm of an ordinary mechanic, further description thereof is deemed unnecessary.

The supporting means 16 is best shown in Figure 1 as comprising a channel iron member 34, a pair of right angularly disposed channel members 36 and 38 secured to the backside of the channel iron member 34 and being of lengths substantially differing from each other. The forwardmost portions 40 and 42 of the channel iron members 36 and 38 are joined by a channel iron member 44. It will thus be seen that the forward side 46 of the channel iron member 44 is angularly disposed with respect to the channel iron member 34 which is attached in parallel relation to the front end of the tractor 38.

A pair of upstanding bars 48 are welded to the forward end portions of the channel iron member 44 and have a pair of apertures formed in each of their ends. A pair of upstanding channel iron elements 50 and 52 are rigidly secured to the bars 48 by means of the lugs 54 extending therefrom, nuts 56 being secured thereon against the backsides of the plates 48. The upper ends of the channel iron elements 50 and 52 are joined by another channel iron member 58, weld or other desired means being employed for connecting their juxtaposed ends. The lower ends of the channel iron elements 50 and 52 are joined by the channel iron element 60. The element 60 has a pair of overlapping ends 62 and 64 to which are removably attached the angle iron elements 66 which are fixedly secured to the upstanding elements 50 and 52. Thus, the lower ends of the channel iron elements 50 and 52 may be opened when desired for a purpose to be hereinafter described.

Looking now at Figures 5 and 7, the attaching means 14 will be described, and the manner in which the mounting frame means 12 is connected to the supporting means 16 will be fully set forth. The attaching means 14 includes a roller frame which is comprised of a cross strut 68, to the ends of which are attached a pair of upstanding channel iron elements 70 and 72. Rollers 74 and 76 are rotatably mounted on the upper and lower ends of the channel iron elements 70 and 72 by means of the pins 78. The outer ends of the wheels 74 and 76 are recessed at 80 and rollers 82 are rotatably disposed therein with their axes in perpendicular relation to the rotational axis of the individual rollers 74 and 76. The pin 84 is adapted to extend through the apertures 86 in the pins 78 and through the rollers 82.

A rod 88 is centrally affixed to the cross strut 68 and outwardly extends therefrom. The mounting frame 12 is formed with a tube 90 of rectangular cross section, and a hollow tube 92 is secured to the underside thereof and extends laterally therefrom. An angulated supporting bar 94 has its extremities secured to the tube 90 and has its center portion underlying the tube 92 for supporting the same.

It will readily be seen that the roller frame of the attaching means will be receivable through the open bottom end of the channel iron standards 50 and 52 and will be freely reciprocable in a vertical direction therebetween. The rake mounting means 12 will be rotatably disposed on the shaft 88 and will be reciprocable with the roller frame also.

The mounting frame means 12 is comprised of a rectangularly cross sectioned tube 90 which has a pair of caster wheels 91 and 93 secured thereto for supporting the same. The caster wheels 91 and 93 are substantially of conventional form and a detailed description thereof is believed to be impertinent. However, as seen in Figure 6, the caster wheels may be provided with a novel friction brake means. The friction brake 26 is comprised of a U-bracket 96 which is received between the pair of bracket elements 98 and 100 mounted on the supporting frame tube 90. A spring 102 is disposed between the bight portion of the bracket element 98 and the bight portion of the U-shaped bracket 96. A cotter pin 104 extends through the legs of the U-shaped bracket 96 and resiliently maintains the elements in their relative positions. The friction pad 106 is secured to the extremity of the plate 108 which is fixedly secured to the sleeve 110 on the upstanding rod 112 of the caster wheel. Thus, as the pad 106 moves upwardly, it will contact the lower end portion of the U-shaped bracket 96, substantially reducing the shimmy of the wheel.

Referring once again to the mounting frame means 12, it will be seen that a plurality of standards 114 are fixedly secured to the upper surface of the tube 90 by means of the bolts 116. The upper ends of the standards 114 are bifurcated at 118 for a purpose to be hereinafter described. At spaced positions and intermediate the standards 114 are a plurality of bearing means 120. The central portion of the tube 90 has bracketed thereto a stand 122 which is provided to securely position the rake when it is not in use. The stand 122 acts as a third leg with the caster wheels 91 and 93 so that the rake 10 may stand by itself when stored or not in use.

As seen best in Figure 1, a plurality of rake disk means 18 are mounted on the mounting frame means 12 by means of the crank arms 124, one end of each of which is rotatably disposed in one of the bearings 120 with the other end 128 being adapted to rotatably receive the hub 130 of one of the raking disks 18. The intermediate portion of each crank arm 124 is provided with a bracket 132 which is formed with a plurality of apertures 133 for a purpose to be hereinafter described.

The control bar means 20 which is comprised of an elongated bar 134 is received in the bifurcated portions 118 of the standards 114 for free rotation therein. The control bar means 20 is provided with a plurality of primary rods 136 which extend from the elongated rod 134 and have their free ends 138 disposed vertically from the end portions 128 of the crank arms 124. A resilient coil spring 140 resiliently connects the free end portion 138 of each of the primary rods 136 with the apertured brackets on the crank arms 124 for resiliently supporting the same and the raking disks 18 mounted thereon.

The elongated bar 134 is also provided with a plurality of secondary arcuated rods 142 which are fixedly secured of the rod 134 and extend in a direction substantially opposite to that in which the primary rods 136 extend. The free end portions of the secondary rods 142 are connected by means of the resilient coil springs 144 to the outstanding brackets 146 which are secured to the mounting frame tube 90.

The control bar means 20 is also provided with a laterally extending actuating rod 148 to the extremity of which is attached a cable 150 which passes over a pulley 152 mounted on the upper end of a standard 154 secured on the channel iron member 34. The cable 150 then extends to a position adjacent to the driver's seat of the tractor whereby the control bar means 20 may be rotated for effecting pivoting movement of the crank arms 124 for raising and lowering the hub portions 130 of the rake disks 18.

The rake disks 18 are individually comprised of a ring 156 which is formed of a flat metallic stock. A plurality of rigidifying spokes 158 are provided and extend between the hub 130 and the ring 156. The rings 156 are provided with outwardly struck tabs 160 which are in groups of three about the circumference of the ring. Closure disks 162, shown in Figure 4, may be provided for covering the open faces of the raking disks whereby as the rake is moved over the field, hay will not pass therethrough but will fall to the ground to be raked to one side of the mechanical rake.

The rake teeth means 11 is seen to comprise a substantially U-shaped wire rod which has its bight portion 162 angulated with respect to the leg portions 164 and 166 and adapted to be resiliently secured between the perforated tabs 160. The leg portions 164 and 166 are arcuated for the most effective raking and have their intermediate portions coiled as at 168 to give added resiliency to the teeth. It will readily be seen that the teeth means 11 may be readily replaced when broken and are also susceptible of easy assembly during manufacturing.

As seen best in Figures 1 and 8, the latching means 22 comprises a channel iron member 170 which has its lower end pivotally mounted with respect to the rectangular cross sectioned tube 90 by means of the gear element 172 and bolt 174. A second channel iron element 176 is telescopically receivable in the first channel iron element 170 and is in opposed relation thereto. The upper end of the second channel iron element 176 is pivotally attached to the arm 178 which is rigidly secured to the control arm 20. A pawl 180 is rotatably disposed on the channel iron element 176 and the channel iron element 170 is provided with an opening in the form of a slot 184. An actuator 182 is carried by the element 170 for engagement with the pawl 180 when the element 176 is raised with respect to the element 170. The rotational movement imparted to the pawl 180 positions the pawl within the slot 184 for retaining the angle iron elements in their respective positions, thereby maintaining the rake disks in their raised positions. When the channel elements are again relatively moved, the actuator 182 again strikes the pawl 180 pivoting it from the locked position, thereby permitting downward movement of the channel element 176 within the channel element 170.

From the foregoing description, taken in conjunction with the drawings, it is believed that a device has been provided which will accomplish all of the objects hereinabove set forth. It will readily be seen that the rake disks 18 may be raised or lowered with respect to the mounting frame and that they are at all times resiliently supported by the coil springs. It will also be seen that the mounting frame 12 is pivotal with respect to the supporting means 16 whereby the entire structure may adapt itself to the contours of the field being raked. Of course, the individual raking disks further adapt themselves to the contour of the field.

Having described the invention, what is claimed as new is:

1. In a raking device, a raking member comprising a wheel having an outer flat rim, a plurality of out-struck tabs on the rim arranged in substantially tri-angular groups of three with two of the tabs in each group being inclined in opposite directions inwardly of the group and with the third tab in each group being inclined outwardly, and a substantially U-shaped tooth for each of said groups of tabs, each tooth having a bight portion of resilient wire-like material angulated with respect to the legs of the tooth with the apex of the bight portion overlying the outwardly inclined tab and with said bight portion being elastically compressed to engage the portion thereof on either side of the apex with the inner surface of the inwardly inclined tabs thereby to hold the tooth in raking position on the wheel.

2. In a raking device, a raking member comprising, a wheel having an outer rim, a group of three tabs on the rim with two of said tabs being inclined in opposite directions inwardly toward the center of the group and with the third tab being inclined outwardly, and a substantially U-shaped tooth having a resilient bight portion the apex of which overlies the outwardly inclined tab with said bight portion being elastically compressed to engage the portion thereof on either side of the apex with the inner surface of the inwardly inclined tabs thereby to hold the tooth in raking position on the rim.

3. In a raking device, a raking member comprising, a wheel having an outer rim, a plurality of tabs on the rim, and a substantially U-shaped tooth having a resilient bight portion angulated with respect to the legs of the tooth and elastically deformed to engage the tabs thereby to hold the tooth in raking position on the rim.

4. In a raking device, a raking member comprising, a wheel having an outer rim, means forming a plurality of tabs on the rim, and a rake tooth having a portion of resilient material elastically deformed to engage the tabs thereby to hold the tooth in raking position on the rim.

5. A tooth adapted to be attached to a wheel having a plurality of tabs formed thereon comprising a member shaped to form a tooth, a resilient substantially U-shaped portion fixed to the tooth and angulated with respect thereto, said U-shaped portion being adapted to be elastically deformed to engage the tabs thereby to hold the tooth on the wheel.

6. A raking tooth adapted to be attached to a wheel having a plurality of tabs formed thereon comprising a substantially U-shaped member of resilient wire-like material, said member having a bight portion extending at an angle of approximately 90° with respect to the legs of the tooth member and adapted to be elastically deformed to engage the tabs thereby to hold the tooth on the wheel.

References Cited in the file of this patent

UNITED STATES PATENTS

| Number | Name | Date |
|---|---|---|
| 676,320 | Johnson | June 11, 1901 |
| 1,297,907 | Rand | Mar. 18, 1919 |
| 1,628,038 | Draper | May 10, 1927 |
| 1,658,430 | Donald | Feb. 7, 1928 |
| 2,040,689 | Duhain | May 12, 1936 |
| 2,237,002 | Kelley | Apr. 1, 1941 |
| 2,296,065 | Slamp | Sept. 15, 1942 |
| 2,447,354 | Morrill | Aug. 17, 1948 |
| 2,459,961 | Pollard | Jan. 25, 1949 |
| 2,472,260 | Morrill | June 7, 1949 |
| 2,514,560 | Scranton | July 11, 1950 |
| 2,531,934 | Crose | Nov. 28, 1950 |
| 2,532,652 | Wray | Dec. 5, 1950 |